Oct. 12, 1965

G. G. GREULICH ETAL 3,211,425

AIRPLANE TRANSPORTER VEHICLE

Filed April 20, 1964

5 Sheets—Sheet 1

INVENTORS.
GERALD G. GREULICH
THOMAS A. GREULICH
BY
Brown, Critchlow, Flick & Peckham.
ATTORNEYS.

Oct. 12, 1965   G. G. GREULICH ETAL   3,211,425
AIRPLANE TRANSPORTER VEHICLE
Filed April 20, 1964   5 Sheets-Sheet 2
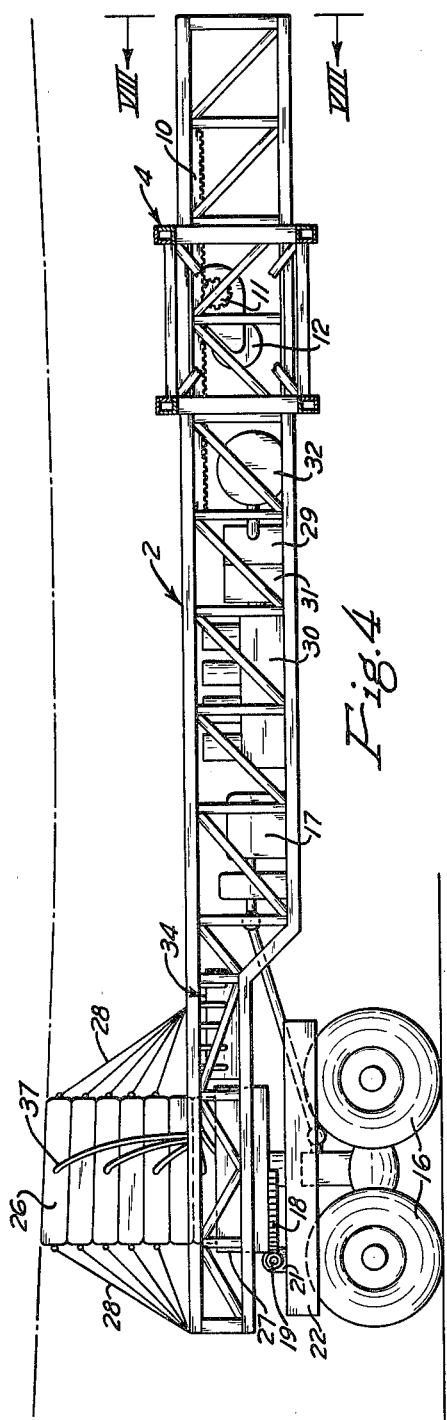
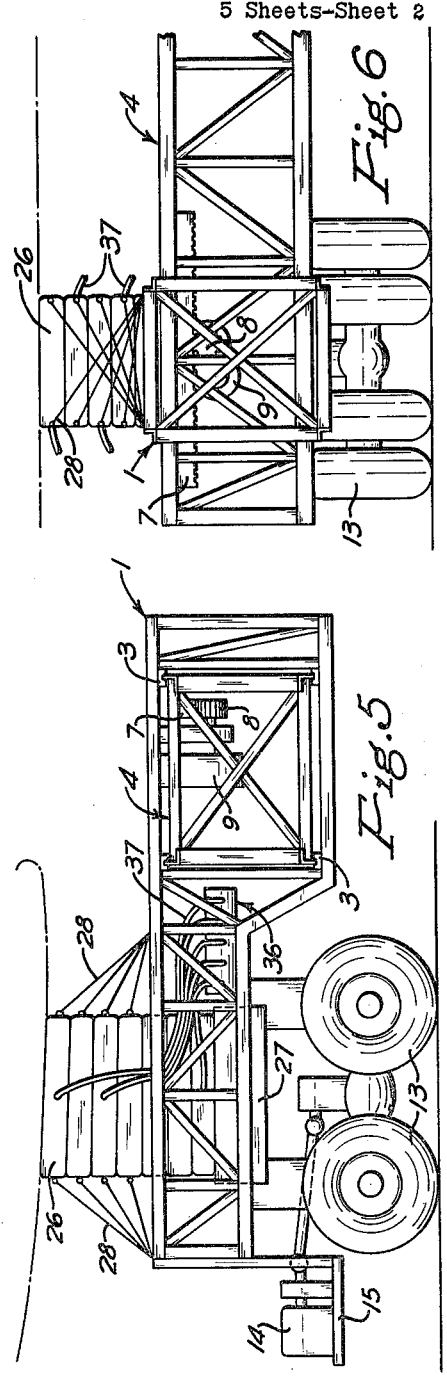
INVENTORS.
GERALD G. GREULICH
THOMAS A. GREULICH
BY
*Brown, Critchlow, Flick & Peckham.*
ATTORNEYS.

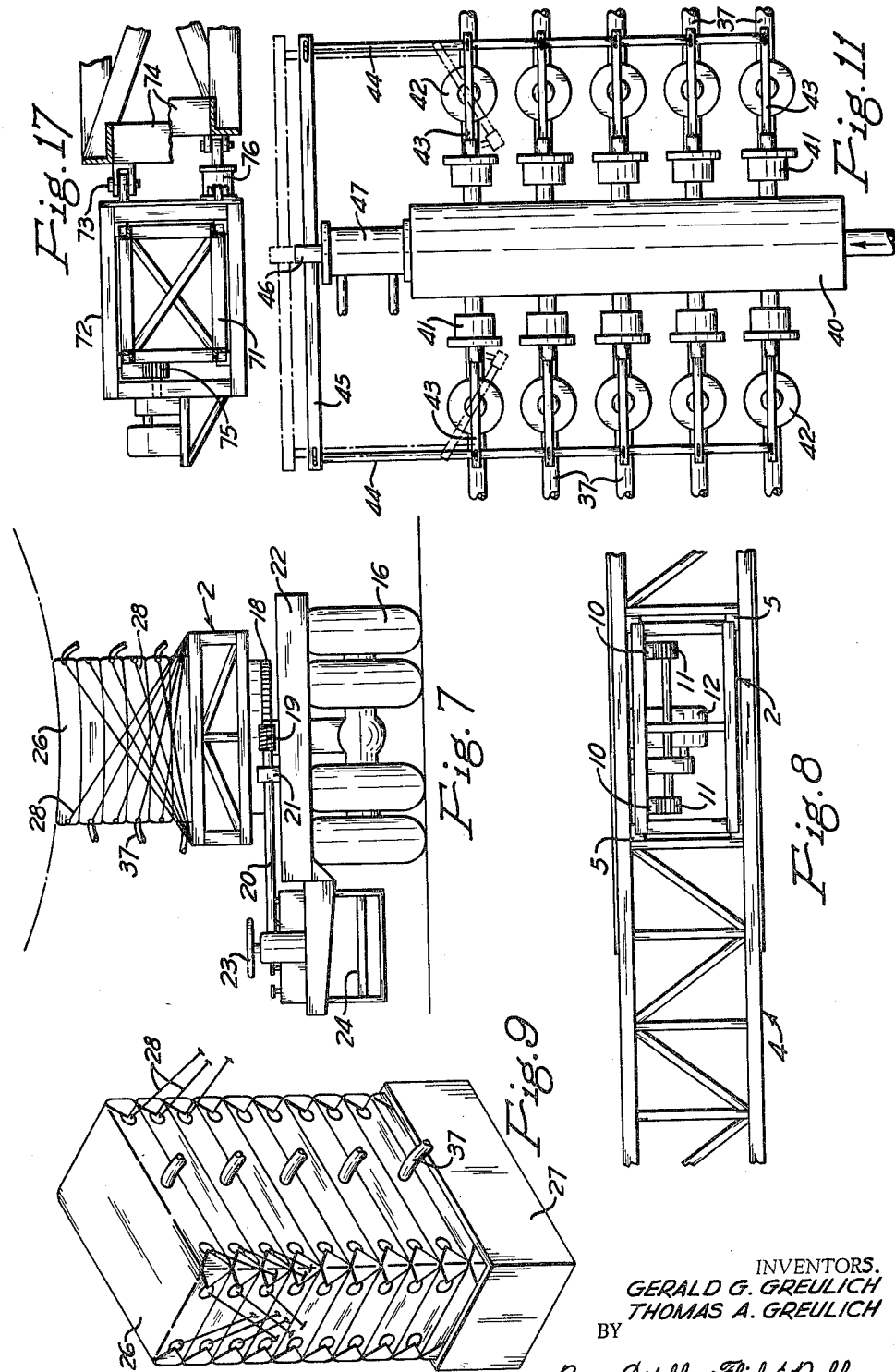

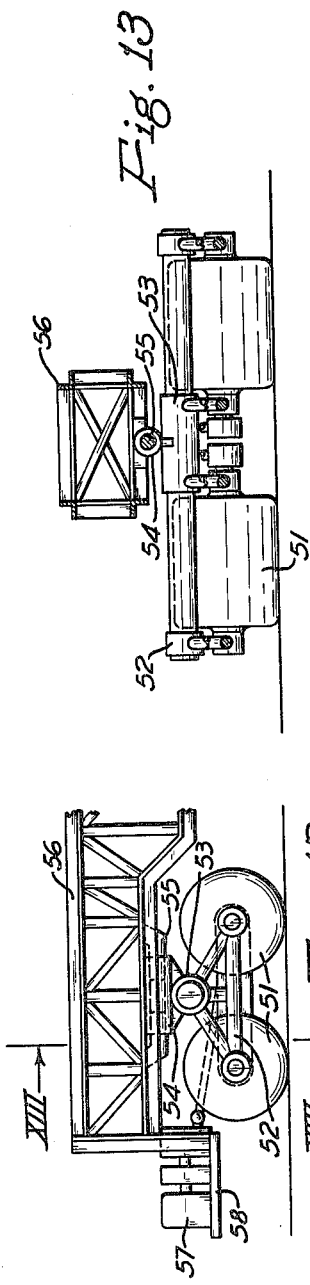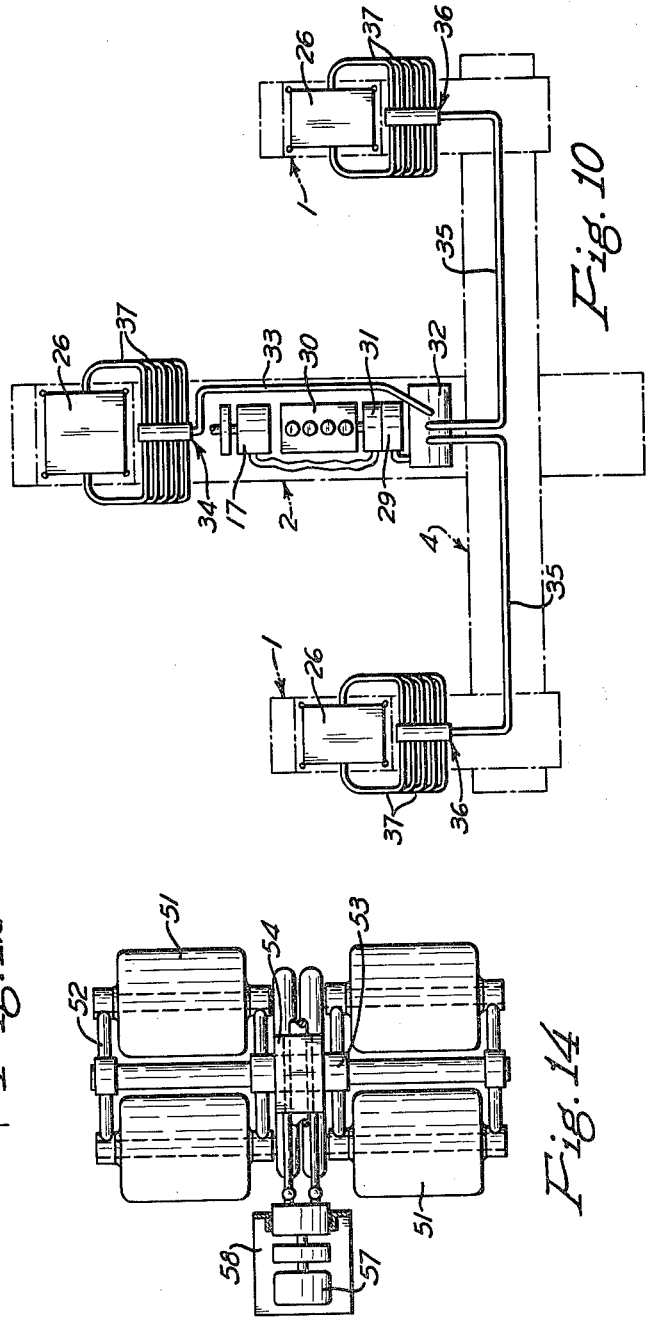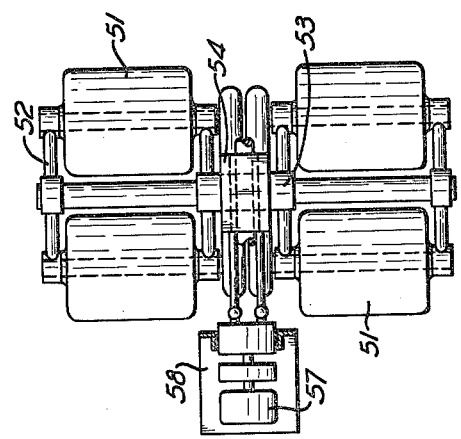

INVENTORS.
GERALD G. GREULICH
THOMAS A. GREULICH
BY
Brown, Critchlow, Flick & Peckham.
ATTORNEYS.

United States Patent Office 3,211,425
Patented Oct. 12, 1965

3,211,425
AIRPLANE TRANSPORTER VEHICLE
Gerald G. Greulich, 3018 NE. 20th Court, Fort Lauderdale, Fla., and Thomas A. Greulich, 609 Ravencrest Road, Pittsburgh, Pa.
Filed Apr. 20, 1964, Ser. No. 361,052
14 Claims. (Cl. 254—2)

This invention relates to self-propelled vehicles, and more particularly to vehicles for transporting airplanes on landing fields.

While an airplane is at an airport it frequently is desirable to move it from one location to another by means other than its own power. For example, it may be desirable to move the plane from the ramp to a hanger or vice versa, or it may be necessary to move it across rough terrain from one runway to another. Vehicles have been suggested for carrying planes at airports for such purposes, but they have required the planes to be manipulated in order to load them on the vehicles. There also are instances where a plane needs to be jacked up in order to permit work on the brakes or wheels. A transporter vehicle, on which the wheels of the plane rest, cannot be used for such repairs.

It is among the objects of this invention to provide a vehicle for transporting aircraft, which can be driven beneath an airplane and then manipulated to lift the plane from the ground, which leaves the wheels hanging free, which is readily adjustable for airplanes of different sizes, which does not damage the planes, which supports an airplane at widely spaced points for maximum load stability, and which is simple and easy to use.

In accordance with this invention the transporter vehicle includes a frame that has a pair of laterally spaced side trusses and a central truss, each of which is supported by wheels. Means are provided for adjusting the side trusses toward and away from each other and for adjusting the central truss forward and backward relative to the side trusses. Jacks are mounted on the trusses. Preferably, the jacks are composed of stacks of inflatable cushions. The frame can be driven beneath an airplane to position the side jacks beneath the wings beside the plane wheels and to position the central jack under the fuselage. Then the jacks are raised to lift the plane from the ground for transportation by the vehicle to another location.

The invention is illustrated in the accompanying drawings, in which

Figure 1:
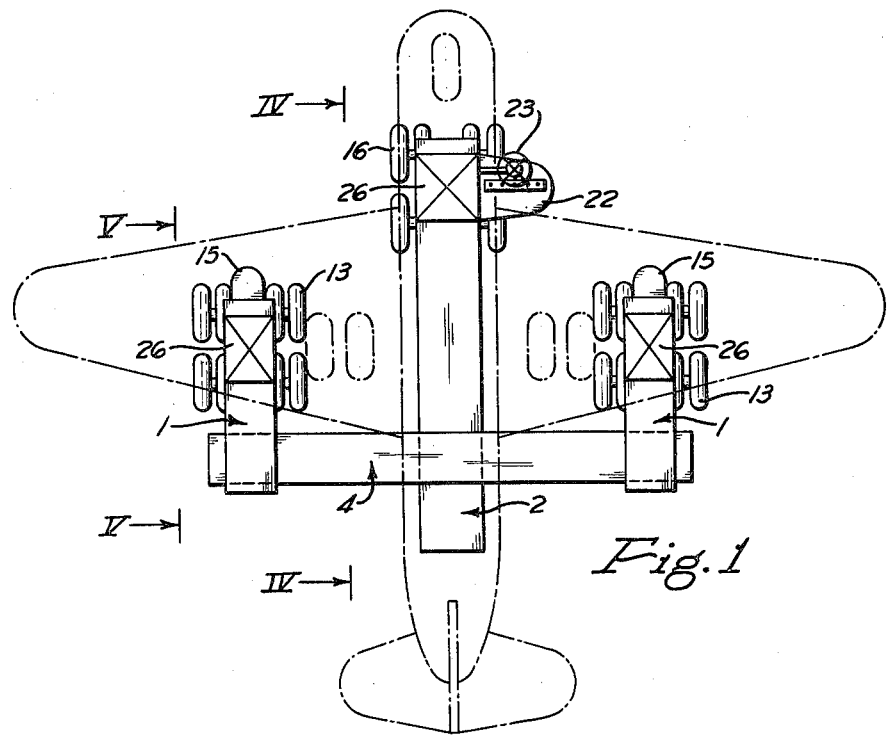
Figure 2:
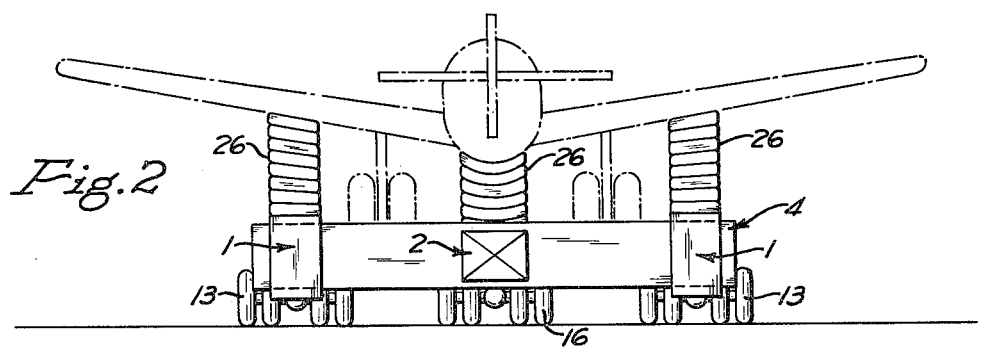
Figure 3:
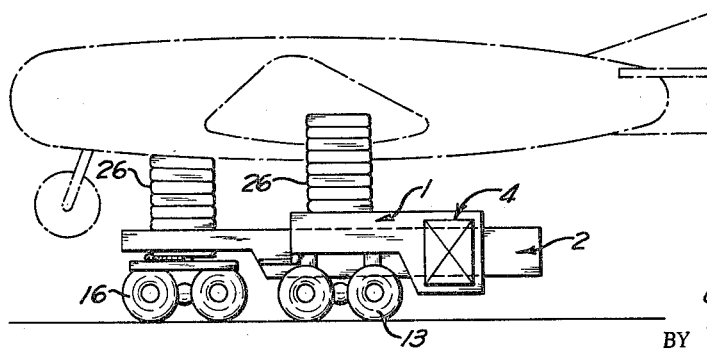
Figure 15:
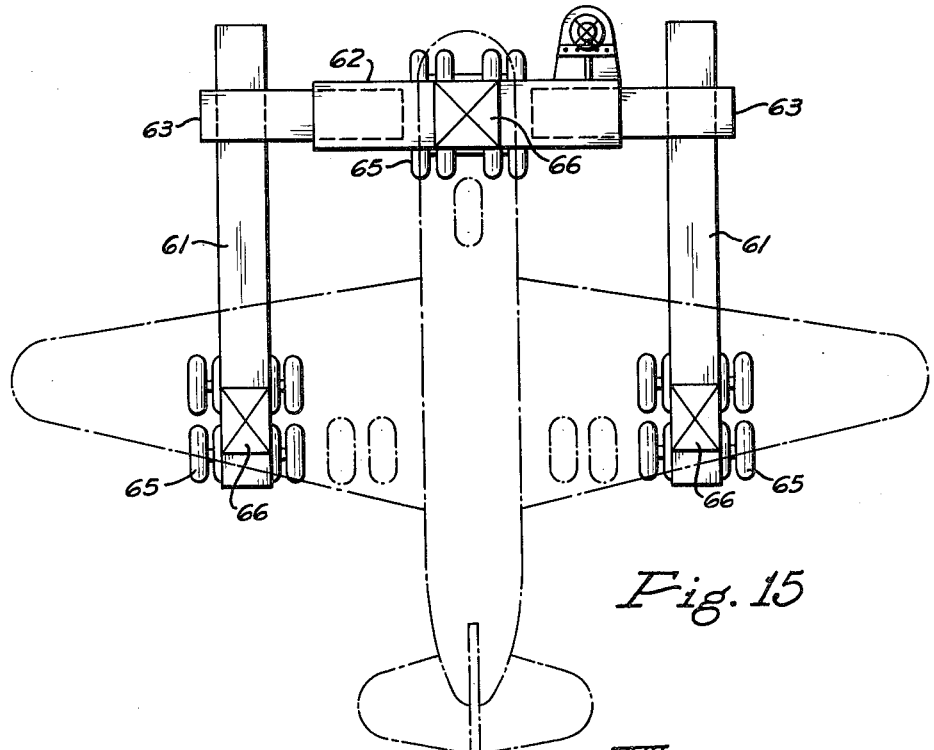
Figure 16:
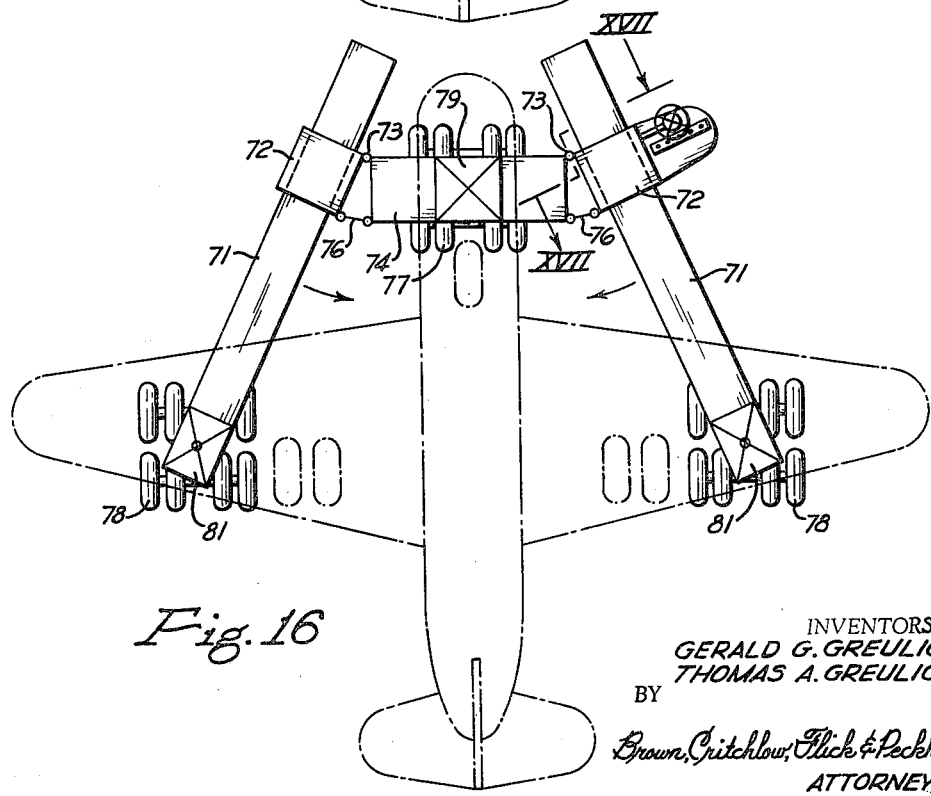

FIG. 1 is a plan view of my vehicle;
FIG. 2 is a rear view thereof;
FIG. 3 is a side view;
FIG. 4 is an enlarged vertical section taken on the line IV—IV of FIG. 1;
FIG. 5 is an enlarged side view of one of the side trusses;
FIG. 6 is a rear view of the side truss shown in FIG. 5;
FIG. 7 is a front view of the central truss shown in FIG. 4;
FIG. 8 is a rear view of the central truss shown in FIG. 4;
FIG. 9 is a perspective view of one of the elevated jacks;
FIG. 10 is a diagram of the pneumatic pressure system for the jacks;
FIG. 11 is an enlarged plan view of one of the valve manifolds for the jacks;
FIG. 12 is a fragmentary side view of the front end of a modified central truss and under carriage;
FIG. 13 is a vertical section taken on line XIII—XIII of FIG. 12;
FIG. 14 is a plan view of the under carriage shown in FIG. 12;
FIG. 15 is a plan view of a modified embodiment of the invention;
FIG. 16 is a plan view of a further modification; and
FIG. 17 is a fragmentary enlarged vertical section taken on the line XVII—XVII of FIG. 16.

Referring to FIGS. 1 to 8 of the drawings, the vehicle chassis or frame is formed from four structural steel members, preferably in the form of box trusses. Hereafter, these elements of the frame will be referred to as trusses. There are two short parallel side trusses 1, between which there is a long central truss 2 parallel to them and extending ahead of them. The rear ends of the side trusses are provided with transverse openings containing suitable tracks 3 (FIG. 5), in which the end portions of a long transverse truss 4 are slidably mounted. The central part of the transverse truss is provided with an opening extending from front to back and containing tracks 5 (FIG. 8), in which the rear end portion of the central truss 2 is slidably mounted. Consequently, the two side trusses can be moved toward and away from each other along the transverse truss, while the central truss can be moved forward and backward in the transverse truss. These adjustments can be made in various ways. A convenient way of adjusting the side trusses is to rigidly mount a toothed rack 7 inside each end of the transverse truss lengthwise thereof in engagement with a pinion 8 driven by an electric power unit 9 secured in the surrounding side truss, all as shown in FIGS. 5 and 6. Adjustment of the central truss may be accomplished in a similar manner, as shown in FIGS. 4 and 8, by mounting in it parallel racks 10 extending lengthwise of the truss and engaged by pinions 11 driven by an electric power unit 12 mounted inside the surrounding portion of the transverse truss.

The front end portion of each of the two side trusses is mounted on an under carriage or running gear that includes a set of suitable wheels, which may be conventional rubber-tired wheels 13. They may be driven from an electric motor 14, mounted on a bracket 15 projecting from the front of the truss as shown in FIG. 5. The front end of the central truss likewise is mounted on running gear having wheels 16 of any suitable type that may be driven from an electric motor 17 behind them in the truss as shown in FIG. 4. The center running gear is pivotally mounted for steering. As shown in FIG. 7, there is a partial ring gear 18 rigidly attached to the bottom of the central truss and engaged by a worm gear 19 on the inner end of a shaft 20 journaled in bearings 21 mounted on a platform 22 forming part of the running gear. The shaft can be turned by a steering wheel 23 connected with the outer end of the shaft above a lateral extension of the platform at one side of the central truss. Attached to the platform extension is a seat 24 for an operator. As shown in FIG. 1, the three sets of wheels are disposed in a triangle, with the side sets behind the center set, to provide widely spaced three point support for the frame.

Mounted on the transporter vehicle frame are jacks, by which an airplane, shown in broken lines in the drawings, can be lifted from the ground after the vehicle has been driven under it. There are three jacks, each one mounted on a truss directly above the running gear supporting that truss. These jacks may take various forms having cushioned or padded tops, but it is preferred to make each jack from a stack of inflatable cushions 26. Normally, the cushions are deflated and are housed in a well in the supporting truss. The well may be formed by an open-top box 27 (FIG. 9) set into the truss. The edges of each cushion, preferably at the corners, are connected to elastic guy lines 28, the outer ends of which are secured to the truss in such positions that they will restrain the cushions from moving laterally appreciably when they are inflated to raise the jacks out of their wells.

Inflation of the jack cushions is accomplished by means of a compressor 29, shown in FIGS. 4 and 10, carried by the central truss and driven by a diesel engine 30 which also drives an electric generator 31 for the various electric power units or motors carried by the frame. The compressor delivers air under pressure to a storage tank 32 behind it. As shown in FIG. 10, the tank is connected by a hose or pipe 33 to a valve manifold 34 near the center jack, and by flexible hoses 35 to valve manifolds 36 in the side trusses. Each manifold is connected by flexible tubes 37 with the adjacent jack cushions. The insides of the cushions are not in communication with one another, so if one is punctured the entire jack will not descend. As the cushions in any given jack are inflated they will stretch the elastic guy lines 28, which will hold them in vertical alignment with one another in the truss.

Each manifold may include a tubular housing 40 shown in FIG. 11, to one end of which the pipe or a hose from the compressor tank is connected. The opposite sides of the housing are provided with rows of outlet ports connected by pressure regulators 41 and throttle valves 42 to tubes 37. The valves are operated by means of pivoted levers 43 that are swung in unison by two side bars 44 connected at one end by a cross bar 45. The center of the cross bar is attached to a piston rod 46 projecting from a cylinder 47 mounted on the closed end of housing 40. By admitting fluid pressure to one end or the other of the cylinder, the valves can be opened and closed to any extent desired. The manifold valves, as well as the electric motors, are controlled by the operator by means of suitable controls operated by him from his seat behind the steering wheel.

It will be seen that an airplane transporter vehicle constructed as described herein can be driven beneath planes of different sizes and then operated to lift them from the ground. Obviously, this is much better than a transporter vehicle that requires a plane to be driven or pulled onto it. As the plane is supported by jacks engaging only its fuselage and wings, the wheels are left hanging free for inspection and repair of them and their suspensions. The jacks are of such construction that they engage relatively large areas of a plane and do so without damaging or marring the engaged surfaces.

Although ordinary pneumatic rubber-tired wheels may be used for supporting the frame as has been described thus far, in some cases it may be desirable to use wheels of the swamp buggy type, such as shown in FIGS. 12, 13 and 14. As is well known, such wheels 51 are formed from hollow cylinders of rubber or the like which have been inflated. These should be mounted on parallel axles in a running gear frame 52, the upper central portion of which is rockably mounted in a transverse sleeve 53 secured to the bottom of a longitudinal sleeve 54. The latter is rockably mounted on trunnions 55 secured to the bottom of the vehicle frame 56. With this arrangement, the under carriage can tilt forward and backward and also sideways as it travels over irregular terrain. The wheels may be driven by an electric motor 57 mounted on a bracket 58 supported by the front end of frame 56.

In the embodiment of the invention shown in FIG. 15 there is a pair of laterally spaced parallel side trusses 61 connected by a transverse member. The latter is at the front end of the vehicle chassis or frame instead of at the rear end as shown in FIG. 1, and is formed from a central truss 62 perpendicular to the side trusses and from intermediate trusses 63 telescoped in its opposite ends. The outer ends of the intermediate trusses are provided with openings, through which the front end portions of the side trusses extend. The side trusses can be adjusted forward and backward in the intermediate trusses by any suitable means, such as by racks and pinions as previously described herein. Also, the side trusses can be adjusted toward and away from each other by moving the intermediate trusses in a similar manner in or out of the central truss.

The vehicle frame is supported by three sets of wheels 65, one set being located beneath the center of the central truss and the other two sets supporting the rear ends of the side trusses. Supported by the trusses above each set of wheels is a jack 66 that preferably is formed from inflatable cushions as described in connection with the first embodiment of this invention. The frame is adjusted so that after it has been driven beneath a plane the rear jacks can be raised into engagement with the bottoms of the wings beside the plane wheels and the front jack can be raised against the bottom of the front end of the fuselage. Expansion or raising of the jacks will lift the plane from the ground with its wheels hanging down inside the frame. The equipment for driving and steering the vehicle, adjusting it and raising and lowering the jacks is not shown, but can be like that previously described herein.

In the further modification of the invention shown in FIGS. 16 and 17 the general arrangement of the transporter vehicle frame is similar to that shown in FIG. 15 but, instead of adjusting the side trusses toward and away from each other by moving them straight in and out in parallel relation, the rear ends of the side trusses 71 are swung toward and away from each other. The front ends of these trusses extend slidably through intermediate sleeve-like trusses 72 that are puivoted on vertical axes 73 at the front corners of a transverse central truss 74. The side trusses can be adjusted in the intermediate trusses 72 by racks and pinions 75 as before. The intermediate trusses are swung on their pivots by means of horizontal jacks in the form of screws or fluid pressure cylinders 76 pivotally connected to the rear corners of the central truss and adjacent corners of the intermediate trusses. When these horizontal jacks are extended, the rear ends of the side trusses will be swung away from each other.

The central part of the central truss 74 is mounted on wheels 77, while the rear ends of the side trusses likewise are supported by sets of wheels 78. The latter are connected with the trusses above them on vertical pivots and suitable provision is made (not shown) for turning the wheels relative to the trusses as they are swung in and out, whereby to maintain the axles perpendicular to the longitudinal axis of the center truss. A jack 79, preferably of inflatable cushions, is mounted on the center truss for engaging the bottom of the front end of a plane. Similar jacks 81 are mounted on the rear ends of the side trusses for engaging the bottom of the wings. When the jacks are raised, the plane will be lifted from the ground and then the transporter vehicle can be driven in the manner described in connection with FIG. 1 to the location to which it is desired to transport the plane.

According to the provisions of the patent statutes, we have explained the principle of our invention and have illustrated and described what we now consider to represent its best embodiment. However, we desire to have it understood that, within the scope of the appended claims, the invention may be practiced otherwise than as specifically illustrated and described.

We claim:

1. An airplane transporter vehicle comprising a frame having a pair of laterally-spaced side trusses and a central truss, wheels supporting each of said trusses, means for adjusting said side trusses toward and away from each other, means for adjusting said central truss forward and backward relative to the side trusses, jacks mounted on said trusses, means for driving said frame beneath an airplane to position the side jacks beneath the airplane wings and to position the central jack under the fuselage, and means for raising said jacks to lift the airplane from the ground for transportation by said vehicle to another location.

2. A vehicle according to claim 1, in which said adjusting means include racks and pinions.

3. A vehicle according to claim 1, in which each of said jacks is formed from a stack of normally deflated pneumatic cushions, and means is mounted on said frame for inflating the cushions.

4. A vehicle according to claim 1, in which each of said jacks is formed from a stack of normally deflated pneumatic cushions, said frame being provided with wells receiving the deflated cushions, and means is mounted on the frame for inflating the cushions to raise them out of said wells.

5. A vehicle according to claim 1, in which each of said jacks is formed from a stack of normally deflated pneumatic cushions, elastic guy lines are connected to the edges of the cushions and to the frame to restrain the cushions from lateral displacement, and means is mounted on said frame for inflating the cushions.

6. An airplane transporter vehicle comprising a frame having a pair of laterally-spaced side trusses and a central truss parallel thereto and a transverse truss crossing said side and central trusses, wheels supporting said side and central trusses, means for adjusting the side trusses toward and away from each other along said transverse truss, means for adjusting the central truss forward and backward across said transverse truss, jacks mounted on the side and central trusses, means for driving said frame beneath an airplane to position the side jacks beneath the airplane wings and to position the central jack under the fuselage, and means for raising said jacks to lift the airplane from the ground for transportation by said vehicle to another location.

7. A vehicle according to claim 6, in which said transverse truss extends slidably through the side trusses, and said central truss extends slidably through the central portion of the transverse truss.

8. A vehicle according to claim 6, in which said transverse truss extends slidably through the rear ends of the side trusses, the rear end portion of said central truss extends slidably through the central portion of the transverse truss, and said wheels and jacks are mounted at the front ends of the side and central trusses.

9. An airplane transporter vehicle comprising a frame having a pair of laterally-spaced side trusses and a central truss extending transversely thereof and intermediate trusses at the opposite ends of the central truss, the intermediate trusses extending lengthwise of the central truss and being adjustable lengthwise thereof, wheels supporting said side and central trusses, means for adjusting the side trusses across the intermediate trusses, jacks mounted on the side and central trusses, means for driving said frame beneath an airplane to position the side jacks beneath the airplane wings and to position the central jack under the fuselage, and means for raising said jacks to lift the airplane from the ground for transportation by said vehicle to another location.

10. A vehicle according to claim 9, in which the inner ends of said intermediate trusses are telescoped into the ends of the central truss, and said side trusses extend slidably through the outer ends of the intermediate trusses.

11. A vehicle according to claim 9, in which the inner ends of said intermediate trusses are telescoped into the ends of the central truss, the front end portions of said side trusses extend slidably through the outer ends of the intermediate trusses, and said wheels and jacks are mounted at the rear ends of the side trusses and the central portion of the central truss.

12. An airplane transporter vehicle comprising a frame having a pair of laterally-spaced side trusses and a central truss extending transversely thereof and intermediate trusses at the opposite ends of the central truss, the intermediate trusses being pivoted on vertical axes to the opposite ends of said central truss, wheels supporting said side and central trusses, means for adjustably swinging the intermediate trusses forward, means for adjusting the side trusses across the intermediate trusses, jacks mounted on the side and central trusses, means for driving said frame beneath an airplane to position the side jacks beneath the airplane wings and to position the central jack under the fuselage, and means for raising said jacks to lift the airplane from the ground for transportation by said vehicle to another location.

13. A vehicle according to claim 12, in which said side trusses extend slidably through the intermediate trusses.

14. A vehicle according to claim 12, in which the front end portions of said side trusses extend slidably through the intermediate trusses, and said wheels and jacks are mounted at the rear ends of the side trusses and the central portion of the central truss.

No references cited.

MARVIN A. CHAMPION, *Primary Examiner.*